US010375446B2

(12) United States Patent
Anttila et al.

(10) Patent No.: US 10,375,446 B2
(45) Date of Patent: Aug. 6, 2019

(54) SYSTEM AND METHOD FOR DISTRIBUTING PROMOTION MESSAGES TO A COMMUNICATION TERMINAL

(75) Inventors: Akseli Anttila, Helsinki (FI); Mikko Makipaa, Helsinki (FI); Toni Kopra, Vantaa (FI)

(73) Assignee: Provenance Asset Group LLC, Pittsford, NY (US)

( * ) Notice: Subject to any disclaimer, the term of this patent is extended or adjusted under 35 U.S.C. 154(b) by 2453 days.

(21) Appl. No.: 10/518,686

(22) PCT Filed: Jul. 1, 2002

(86) PCT No.: PCT/IB02/02516
§ 371 (c)(1),
(2), (4) Date: Dec. 17, 2004

(87) PCT Pub. No.: WO2004/004383
PCT Pub. Date: Jan. 8, 2004

(65) Prior Publication Data
US 2006/0019702 A1    Jan. 26, 2006

(51) Int. Cl.
| | | |
|---|---|---|
| G06Q 30/02 | (2012.01) |
| H04N 21/4788 | (2011.01) |
| H04M 1/725 | (2006.01) |
| H04M 3/487 | (2006.01) |
| H04N 7/173 | (2011.01) |
| H04N 21/254 | (2011.01) |

(Continued)

(52) U.S. Cl.
CPC ..... *H04N 21/4788* (2013.01); *G06Q 30/0251* (2013.01); *H04M 1/72547* (2013.01); *H04M 1/72566* (2013.01); *H04M 3/4878* (2013.01); *H04N 7/17318* (2013.01); *H04N 21/254* (2013.01); *H04N 21/41407* (2013.01); *H04N 21/47214* (2013.01); *H04N 21/4882* (2013.01); *H04W 4/06* (2013.01)

(58) Field of Classification Search
CPC ................... G06Q 30/0207–30/0277
USPC .......................................... 705/14
See application file for complete search history.

(56) References Cited

U.S. PATENT DOCUMENTS 5,918,159 A * 6/1999 Fomukong et al. ......... 340/7.21
6,587,835 B1 * 7/2003 Treyz et al. ............... 705/14.64
(Continued)

FOREIGN PATENT DOCUMENTS

| | | |
|---|---|---|
| EP | 1 109 415 | 6/2001 |
| WO | WO 96/34491 | 10/1996 |
| WO | WO 99/45702 | 9/1999 |

OTHER PUBLICATIONS

PCT International Search Report (as published), International Application No. PCT/IB2002/002516, Date of Completion of Search—Nov. 26, 2002.

(Continued)

*Primary Examiner* — Jamie R Kucab
(74) *Attorney, Agent, or Firm* — Dinsmore & Shohl LLP (57) ABSTRACT

This invention relates to a system and a method for distributing an invitation to one or more communication terminals connected in a wireless communications network. The system and method enables a user of a communication terminal to invite other users of communication terminals to a shared media experience, such as watching a television transmission at the same time, while the users may be at different locations.

22 Claims, 4 Drawing Sheets

(51) Int. Cl.
*H04N 21/414* (2011.01)
*H04N 21/472* (2011.01)
*H04N 21/488* (2011.01)
*H04W 4/06* (2009.01)

(56) References Cited

U.S. PATENT DOCUMENTS

| | | | |
|---|---|---|---|
| 7,103,678 B2* | 9/2006 | Asai et al. | 709/245 |
| 2001/0051517 A1* | 12/2001 | Strietzel | 455/414 |
| 2002/0026496 A1 | 2/2002 | Blackwell et al. | |
| 2003/0191685 A1* | 10/2003 | Reese | 705/14 |

OTHER PUBLICATIONS

Chinese Office action of corresponding CN App. No. 200910146535.9 dated Apr. 28, 2010, pp. 1-10.
Chinese Office action of corresponding CN patent App. No. 200910146535.9 dated Jul. 5, 2010, pp. 1-7.

* cited by examiner

SYSTEM AND METHOD FOR DISTRIBUTING PROMOTION MESSAGES TO A COMMUNICATION TERMINAL

FIELD OF INVENTION

This invention relates to a system and a method for distributing an invitation to one or more communication terminals connected in a wireless communications network. The invention, in particular, relates to invitations related to various types of media events.

BACKGROUND OF INVENTION

Communication terminals, such as mobile or cellular phones, personal office assistants or personal computers, used in a wireless communication network are generally used for voice communication between two or more interconnected communication terminals. Lately, communication terminals have evolved to perform, in addition to voice communication, generation and transmission of text messages such as Short Message Services (SMS) as well as multimedia messages such as Multimedia Message Services (MMS) comprising a video, picture or audio sequence and other type messaging, like operator logo to change view of the display of the communication terminal. Furthermore, the communication terminals have evolved to include personal office assistant features such as calendar, address book, and even email functions.

European patent application no. EP 1 109 415 discloses a messaging exchanging handling concept for communication terminals in a wireless communication network, in which a initiating communication terminal invites one or more other communication terminals to participate in a text message exchange session. The receiver of the invitation responds to a received text message by inputting a text message for replying the received text message. Then the responding communication terminal automatically adds the inputted reply to the received text message, whereby the aggregated text message includes the message exchange session history, and the aggregated text message is transmitted to other communication terminals as part of the message exchange session.

In an increasing growing market for short and multimedia message services demands for a high quality message products is substantiated since some wireless communication network operators have observed that approximately 10 percent of the network traffic is messages. This specific network traffic is expected to further grow in the near future.

As the capabilities of communication terminals increase so does the users' demands for fully exploiting the potential of their specific communication device.

The present technology falls short of providing a satisfactory sharing feature allowing a plurality of users of communication terminals the possibility to share for example a media event together, since the users in some instances need to stay at different physical locations during a transmission of an event.

SUMMARY OF THE INVENTION

The object of the present invention is therefore the provision of a communication system enabling a user of a communication terminal to invite another user of a communication terminal to a shared media experience, such as watching a television transmission at the same time, while the users may be at different locations.

A further object of the present invention is the provision of instant messaging for a larger group of users of communication terminals.

In addition, a particular object of the present invention is the provision of platform for companies to promote their products, such as media properties or events, to a group of users of communication terminals.

An advantage of the present invention is the provision of a system and method for reminding a user of a communication terminal of a media event, which the user wishes to attend.

A further advantage of the present invention is the provision of a platform for launching of group applications on communication terminals when a media experience starts.

A feature of the present invention is the provision of a promotion messaging module incorporated in a communication terminal for automatically launching a group application.

The above objects, the above advantages and the above feature together with numerous other objects, advantages and features which will become evident from below detailed description is accomplished according to a first aspect of the present invention by a system for communicating a promotion message to one or more communication terminals, which promotion message is associated with an event having a start time, and said system comprising:
  (a) an event manager for providing said event to one or more receivers from said start time and for generating a promotion message request;
  (b) a promotion server for communicating said promotion message to said one or more communication terminals through a first communication network in response to receiving said promotion message request from said event manager through a connection interconnecting said event manager and said promotion server; and
  said one or more communication terminals being operable to respond to said promotion message by communicating an acceptance signal through said first communication network to said promotion server, said promotion server comprising a register for associating an accepting communication terminal of said one or more communication terminals with said promotion message on reception of said acceptance signal from said accepting communication terminal and said promotion server being operable to communicate a reminder signal for said event to said accepting communication terminal through said first communication network.

The system provides a unique way to simultaneously remind users of one or more communication terminal about an event which promotion their previously have received and accepted to be reminded of.

The term "one or more" should in this context be construed as a, an, at least one, at least a single.

The one or more receivers according to the first aspect of the present invention may comprise a television, a radio, a set-top box, a receiver module for a computer, a multimedia terminal, a mobile or cellular phone, a personal office assistant, a personal computer, or any combination thereof. The receivers communicate the event to any number of users which may have been reminded of the event through firstly a promotion message and secondly a reminder signal received on a communication terminal.

The promotion message request according to the first aspect of the present invention may comprise information such as the start time, end time of the event, duration of the event, event identity, event type, event presentation platform, promotion message, list of the receivers and the one or more communication terminals, or any combination thereof. In fact the promotion server may operate on information to identify the event on a location such as a television channel as well as to identify the show time of the event on said location.

The promotion server may further contain e.g. schedule of the events then being informed through electronic program guide application. Even the schedule of events may be incorporated to the calendar of the communication terminal so that schedule of events is integrated as part of calendar events. Then the schedule of events shall include respective headers or identifiers to find the place where schedule of events should be incorporated. Corresponding handler in terminal is needed, too.

The event presentation platform according to the first aspect of the present invention may comprise a television, a radio, a set-top box, a receiver module for a computer, a multimedia terminal, a mobile or cellular phone, a personal office assistant, a personal computer, or any combination thereof connected a media communication network, and a network broadcaster. The wide variety of event presentation platforms for presenting the event is limited only by types of media networks transmitting the event and which presentation platforms operate on the specific type of network. The media communication network may comprise a cable television network, a satellite television network, a radio frequency television network, a telephone network, a powerline network, a radio network or any combination thereof.

The first communication network and/or the connection according to the first aspect of the present invention may comprise a wired or wireless telecommunication network, local area network, metropolitan area network, wide area network, or inter-network such as the Internet, a dedicated communication line, or any combination thereof. Basically, the system may be implemented in accordance with any communication guidelines or standards thus providing a very versatile communication system. In fact a combination of the above mention network types constituting the first communication network and/or the connection may be implemented by utilising a Bluetooth application.

The promotion server according to the first aspect of the present invention may comprise a storage device for storing the register, the reminder, the promotion message, and a processor for processing communication with the one or more communication terminals, for processing the promotion message request from the event manager, and for updating content of the storage device. The register may comprise information such as promotion message identity; one or more communication terminal identities; event data such as event title, event type, event presentation platform, event identity and/or event actions; time data such as the start time, end time of the event, duration of the event; group application data such as a group identity comprising one or more communication terminal identities and/or group actions to be performed; or any combination thereof.

The one or more communication terminals according to the first aspect of the present invention may be operable to forward the promotion message from the one or more communication terminals to further communication terminals connected in the first communication network. When the system operates in a peer to peer mode the communication terminals ensure that a promotion message is forwarded as a tree structure progression. Hence the promotion message may be multiplied and communicated to a huge number of communication terminals in the first communication network.

An accepting communication terminal of the above mentioned further communication terminals may be operable to respond to the promotion message by communicating an acceptance signal through the first communication network to the promotion server and the promotion server is operable to associate the accepting communication terminal of the further communication terminals with the promotion message on reception of the acceptance signal from the accepting communication terminal and the promotion server being operable to communicate a reminder signal to the accepting communication terminal through the first communication network. In the client-server mode of the system each accepting communication terminal returns the acceptance signal to the promotion server.

Alternatively, an accepting communication terminal of the further communication terminals may be operable to respond to the promotion message by communicating an acceptance signal through the first communication network to the one or more communication terminals and the one or more communication terminal comprises a local register for associating an accepting communication terminal of the further communication terminals with the promotion message on reception of the acceptance signal from the accepting communication terminal and the one or more communication terminals is operable to communicate a reminder signal to the accepting communication terminal through the first communication network. In the peer to peer mode of the system each accepting communication terminal returns the acceptance signal to the communication terminal, who transmitted the promotion message to the accepting communication terminal.

The one or more communication terminals according to the first aspect of the present invention may be operable to start a predetermined application when receiving said reminder signal. The predetermined application is stored on the one or more communication terminal or alternatively at the promotion server. When the reminder signal is received either from the promotion server or the one or more communication terminal, who transmitted the promotion message to the accepting communication terminal the application is initiated and started on the accepting communication terminal. The application may comprise any text, series of texts, picture, series of pictures, video, sequences of videos, audio track or series of audio tracks or any combination thereof. The application may be group dependent, that is, particular groups of the one or more communication terminals may have certain rituals or rules pertaining to the event.

The above objects and the above advantage together with numerous other objects, advantages and features which will become evident from below detailed description is accomplished according to a second aspect of the present invention by a method for communicating a promotion message to one or more communication terminals, which promotion message is associated with an event having a start time, and said method comprising:

(a) initiating said promotion message by means of a event manager forwarding a promotion message request to a promotion server;

(b) transmitting said promotion message to said one or more communication terminals by means of a promotion server connected to said one or more communication terminals through a first communication network;

(c) receiving said promotion message from said promotion server by means of said one or more communication terminals;

(d) accepting said promotion message by transmitting an acceptance signal to said promotion server by means of said one or more communication terminals;

(e) receiving said acceptance signal from an accepting communication terminal of said one or more communication terminals by means of said promotion server;

(f) associating said accepting communication terminal with said promotion message on reception of said acceptance signal from said accepting communication terminal by means of a register of said promotion server; and (g) transmitting a reminder signal for said event to said accepting communication terminal through said first communication network by means of said promotion server.

The method according to the second aspect of the present invention may further comprise forwarding the promotion message to further communication terminals connected to the first communication network by means of the one or more communication terminals.

The method according to the second aspect of the present invention may further comprise:

(h) accepting the promotion message by transmitting an acceptance signal to the one or more communication terminal by means of the further communication terminals;

(i) receiving the acceptance signal from an accepting communication terminal of the further communication terminals by means of the one or more communication terminals;

(j) associating the accepting communication terminal with the promotion message on reception of the acceptance signal from the accepting communication terminal by means of a local register of the one or more communication terminal; and (k) transmitting a reminder signal for the event to the accepting communication terminal through the first communication network by means of the one or more communication terminal.

The method according to the second aspect of the present invention may further incorporate features of the system according to the first aspect of the present invention.

The above objects and the above advantage together with numerous other objects, advantages and features which will become evident from below detailed description is accomplished according to a third aspect of the present invention by a communication terminal for communicating in a first communication network and for receiving a promotion message and a reminder signal from a promotion server, and comprising a messaging module for transmitting and receiving messages through said first communication network; a calendar module for enabling a user of said communication terminal to perform general calendar operations; a media playback module for outputting said promotion message; a storage module for storing promotion message information, and a promotion messaging module for receiving and transmitting said promotion message.

The communication terminal according to the third aspect of the present invention provides an excellent tool for correlating events to be provided in a first forum to events to be provided in a second forum.

The promotion message information according to the third aspect of the present invention may comprise promotion message identity; one or more communication terminal identities; event data such as event title, event type, event presentation platform, event identity and/or event actions; time data such as the start time, end time of the event, duration of the event; group application data such as a group identity comprising one or more communication terminal identities and/or applications to be performed; or any combination thereof. As mentioned above with reference to the first aspect of the present invention the application is a predetermined action to be performed by the communication terminal when receiving the reminder signal.

The communication terminal according to the third aspect of the present invention may further comprise a display and loudspeaker for communicating the promotion message to a user of the communication terminal. The display and the loudspeaker are utilised by the communication terminal to run promotion messages and general messages such as multimedia message services and short message services as well as for providing a user interface for the user to operate through a menu system.

The storage module according to the third aspect of the present invention may be operable for storing a promotion message identity and information comprising transmitter identity and associated messaging contact information, recipient identity and associated messaging contact information, media event information such as identity code, name or title, start time and end time, and group application data, which data may be operable for initialising and starting a application in response to receiving the reminder signal on the communication terminal.

The communication terminal according to the third aspect of the present invention may further comprise an application utilising an electronic program guide containing information on media events so that the application in cooperation with the calendar provides a reject signal when said communication terminal is busy. In accepting a message the communication terminal may either accept or reject based on the communication terminal's events in the calendar. For example, if the event is marked as BUSY, only reject messages and no acceptance message are sent. That is, if in the communication terminal busy is marked at the defined time of the promotion message, the communication terminal may automatically send busy message. Further, if the promotion server receives e.g. a certain number of reject messages, or the people requested to join are busy, the promotion server reschedules the event.

The communication terminal according to the third aspect of the present invention may further incorporate features of the system according to the first aspect of the present invention and incorporate features of the method according to the second aspect of the present invention.

The event according to all the aspects of the present invention may comprise media events such as television transmissions of movies, sports games or shows; or radio transmissions of music, talk shows or theatrical plays; or events such as premiers of theatre plays or of movies in a cinema; exhibitions of various kinds e.g. art, industry or products; seminars; or conferences; or any combination thereof.

The communication terminal according to all aspects of the present invention may comprise terminals such as mobile or cellular phones, personal digital assistants, personal computers or any combination thereof.

The promotion message may according to all aspects of the present invention comprise a text, a series of texts, a picture, a series of pictures, a video sequence, a series of video sequences, an audio track, a series of audio tracks, or any combinations thereof.

BRIEF DESCRIPTION OF THE DRAWINGS

The above, as well as additional objects, features and advantages of the present invention, will be better under

DETAILED DESCRIPTION OF PREFERRED EMBODIMENTS

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
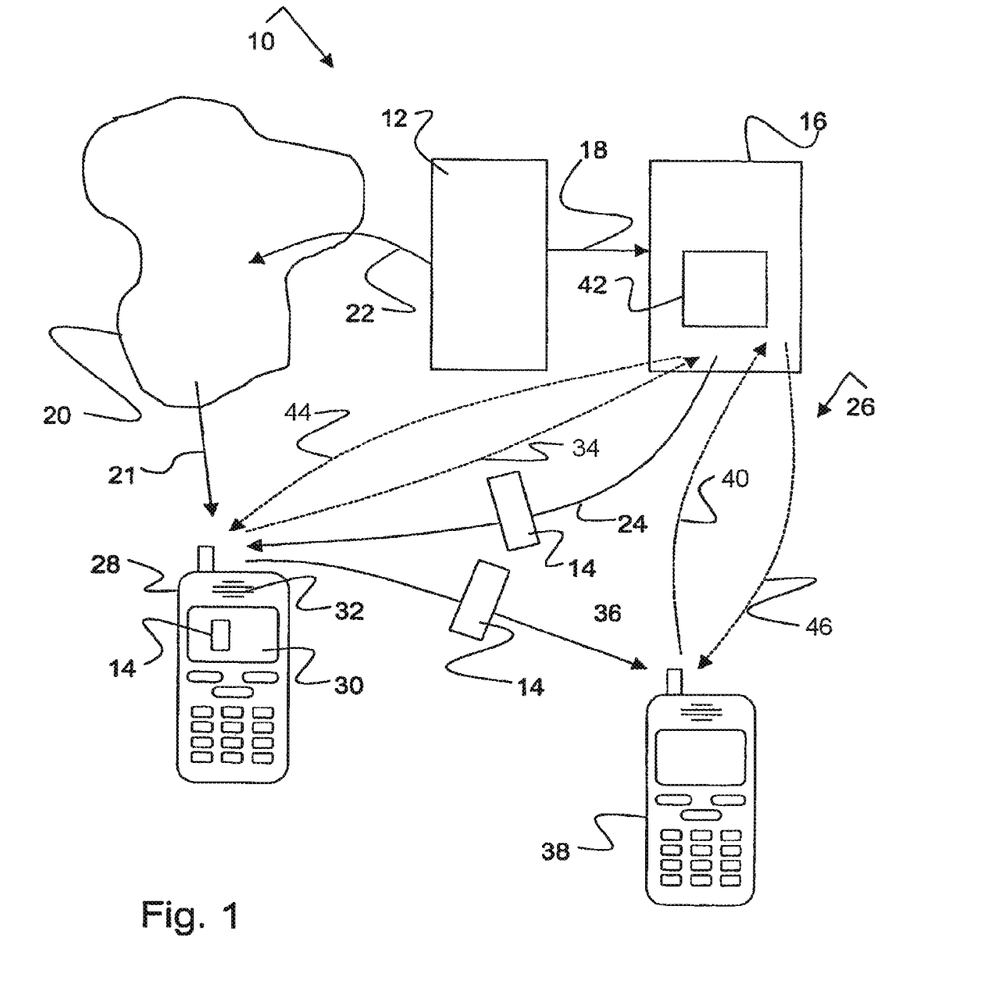
- FIG. 1 shows a system according to a first embodiment of the present invention.

A communication system according to the first embodiment of the present invention is shown in FIG. 1 as designated in its entirety by reference numeral 10. The communication system 10 comprises an event manager 12 such as a television network operator or a concert, theatre, cinema or sports games organiser, as well as an exhibition promoter. The event manager 12 provides a promotion server 16 with a promotion message request through a communication channel 18 inviting recipients to attend an event.

The event may be various types of media events such as television transmissions of movies, sports games or shows; radio transmissions of music, talk shows or theatrical plays; premiers of theatre plays; movies in a cinema; exhibitions of various kinds e.g. art, industry or products; seminars; or conferences The event manager 12 in a first particular embodiment of the present invention communicates with one or more media receivers in a media network 20, which receivers may be a television, a radio, a set-top box, receiver module for a computer or in fact a communication terminal.

The media network 20 may be a television, radio or computer network, or any combination thereof, for communicating media streams such as television transmitted movies, sports games, theatre plays, concerts, or shows to one or more receiver in the media network 20. The communication of media streams is shown in FIG. 1 as arrow 22.

The promotion server 16 distributes a promotion message 14 associated with promotion message request through a communication channel 24 in a wireless communication network 26 to any number of predefined communication terminals. For simplicity shown in FIG. 1 as a single communication terminal 28.

The promotion message 14 may contain a text, a series of texts, a picture, a series of pictures, a video sequence, a series of video sequences, an audio track, a series of audio tracks or any combinations thereof.

The communication terminal 28 receives the promotion message 14 transferred from the promotion server 16 and the user of the communication terminal 28 may run the promotion message 14 on a display 30 and/or a loudspeaker 32 of the communication terminal 28. If the user of the communication terminal 28 finds the promotion message 14 interesting the user returns an acceptance signal 34 through the wireless communication network 26 back to the promotion server 16.

The user of the communication terminal 28 may forward the promotion message 14 through a communication channel 36 in the wireless communication network 26 to other users of communication terminals, shown in FIG. 1 for simplicity as a single communication terminal 38, which other users, in case they find the promotion message 14 interesting send an acceptance signal 40 through the wireless communication network 26 to the promotion server 16.

The acceptance signals 34 and 40 contain information regarding promotion message identity (i.e. identity of the promotion message 14 associating to a certain event manager 12), recipient identity (i.e. identity of communication terminal 28 or 38).

When received by the promotion server 16 the information contained in the acceptance signals 34 and 40 are associated in a database 42 of the promotion server 16 with property data (i.e. actions to be taken by the promotion server 16 when a user accepts an invitation in the promotion message 14), time data (e.g. time of when the actions are to be taken by the promotion server 16) and group application data (e.g. group of users who have invited one another).

The promotion server 16 utilises the information in the database 42 for transmitting over the wireless communication network 26 reminders 44 and 46 to the communication terminals 28 and 38 respectively, when the media event starts. Thus the users of the communication terminals 28 and 38, and any other communication terminals, who have transmitted an acceptance signal to the promotion server 16, receive a reminder so as to watch the media event either together or in parallel. In the particular embodiment of the present invention the users have to switch on their receivers.

Figure 2:
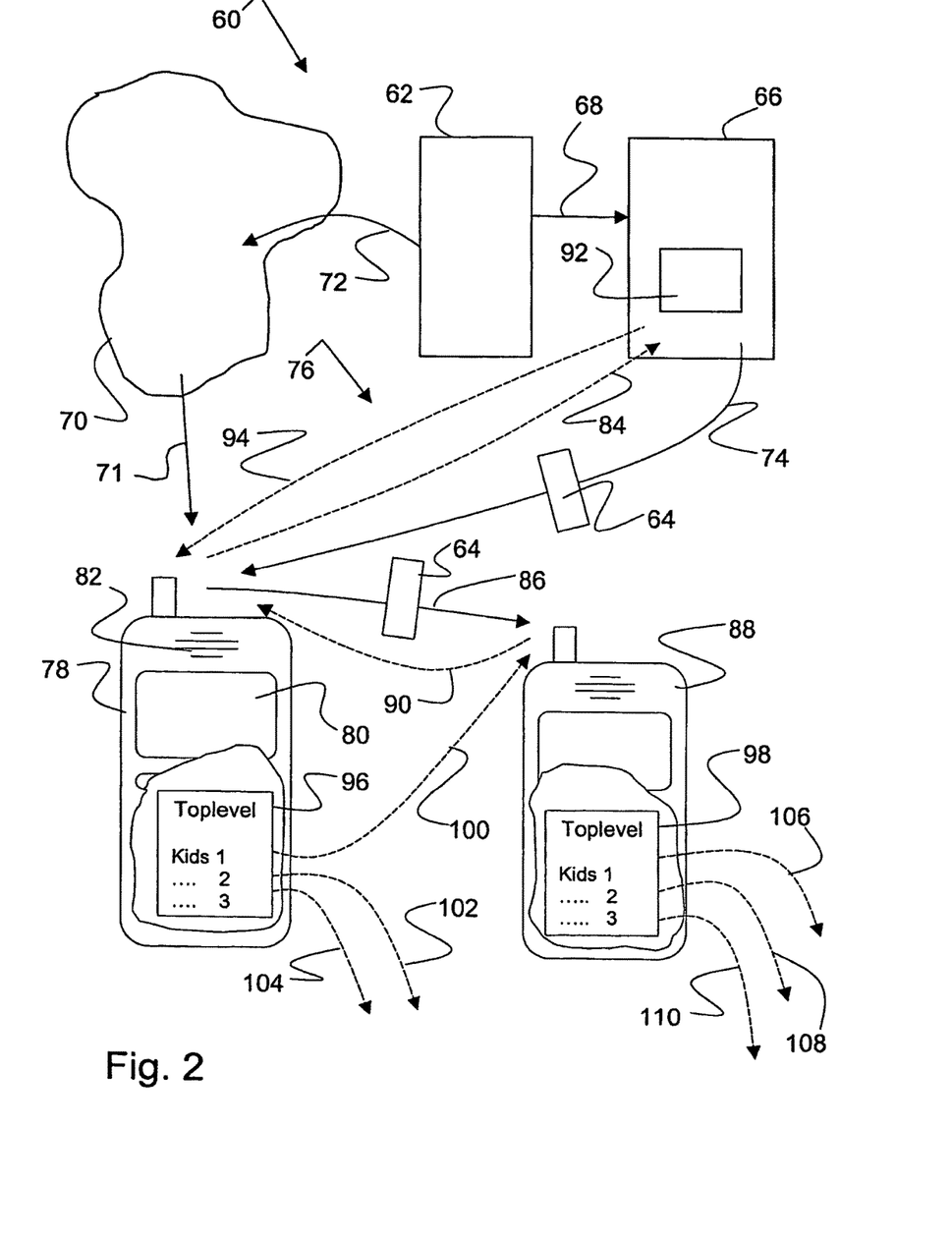
FIG. 2 shows a system according to a second embodiment of the present invention.

A communication system according to the second embodiment of the present invention is shown in FIG. 2 as designated in its entirety by reference numeral 60.

As described with reference to FIG. 1 the communication system 60 comprises an event manager 62 providing a promotion server 66 with a promotion message request inviting recipients to attend an event through a communication channel 68.

The promotion message request causes the promotion server to generate a promotion message 64. As before the promotion message 64 may contain a text, a picture, a series of pictures, a video sequence, a series of video sequences, an audio track, a series of audio tracks or any combinations thereof. In an advanced embodiment of the present invention the text may contain comments from the participants accepting the promotion. The comments may be shown as a message to others joining the event or they can be sent separately as to encourage others to join to the event.

The event manager 62 in a second particular embodiment of the present invention communicates with one or more media receivers in a media network 70, which receivers may be a television, a radio, a set-top box, receiver module for a computer or in fact a communication terminal.

The media network 70 may be a television, radio or computer network, or any combination thereof, for communicating media streams such as television transmitted movies, sports games, theatre plays, concerts, or shows to one or more receiver in the media network 70. The communication of media streams is shown in FIG. 2 as arrow 72.

The promotion server 66 distributes the promotion message 64 through a communication channel 74 in a wireless communication network 76 to any number of predefined communication terminals. For simplicity shown in FIG. 2 as a single communication terminal 78. The communication terminal 78 receives the promotion message 64 transferred from the promotion server 66 and the user of the communication terminal 78 may run the promotion message 64 on a display 80 and/or a loudspeaker 82 of the communication terminal 78. If the user of the communication terminal 78 finds the promotion message 64 interesting the user returns an acceptance signal 84 through the wireless communication network 76 back to the promotion server 66.

The promotion message 64 transferred from the promotion server 66 to the communication terminal 78 may comprise an instruction set which notifies accepting communication terminals of the launch of a shared application, which could be run from the promotion server 66. Hence the communication system 60 allows for a group of communication terminals to share a customary application run by the promotion server 66.

The user of the communication terminal 78 may forward the promotion message 64 through a communication channel 86 in the wireless communication network 76 to other users of communication terminals, shown in FIG. 2 for simplicity as a single communication terminal 88, which other users, in case they find the promotion message 64 interesting send an acceptance signal 90 through the wireless communication network 76 to the communication terminal 78.

The acceptance signals 84 and 90 contain information regarding promotion message identity (i.e. identity of promotion message 64), recipient identity (i.e. identity of communication terminal 78 or 88).

When received by the promotion server 66 the information contained in the acceptance signal 84 is associated in a database 92 of the promotion server 66 with property data (i.e. actions to be taken by the promotion server 66 when a user accepts an invitation in the promotion message 64), and time data (i.e. time of when the actions to be taken by the promotion server 66 is to taken).

The communication terminals 78 and 88 further comprise local databases 96 and 98, respectively, utilised for associating promotion message identity and information comprising transmitter identity (promotion server 66 or inviting communication terminal) and messaging contact information (or a pointer to a participating communication terminal's memory holding this information), recipient identity and messaging contact information (or a pointer to a participating communication terminal's memory holding this information), media event information such as identity code, name or title, start time and end time, and group application data, which data initialises and starts the reminder application on each communication terminal.

The communication terminals 78 and 88, may for example contain a schedule of the events being informed through electronic program guide (EPG) application. Even the schedule of events may be incorporated to the calendar of the communication terminal so that the schedule of events is integrated as part of calendar events. In this case the schedule of events shall include respective headers or identifiers to find the place where the schedule of events should be incorporated. Corresponding handling software and/or hardware in the communication terminal is needed, too.

By means of constructing an electronic program guide (EPG) application in his/her communication terminal for sending promotion messages to other users of communication terminals the existing EPG could be changed or added by embedding information about group event. Then the EPG may include information about a "real" program as well as a promotion message. Thus a single user interface is provided. In addition, information changed or added by the user of the communication terminal about a group event can be included. The user may then store interesting program lists in a more integrated manner as a single application or at least the user has a program guide in at least lesser applications. Calendar events, as described above, can be used in association with EPG. The calendar time event may be linked to the EPG through time as an identifier. The EPG may show the promotion message in a separate "channel" information block so that for example channel 1, channel 2, channel 3 can be shown as usual in addition to promotion message information.

The promotion server 66 utilises the information in the database 92 for transmitting over the wireless communication network 76 a reminder 94 to the communication terminal 78 when the media event starts. The reception of the reminder 94 causes the communication terminal 78 to forward reminders 100, 102 and 104 to communication terminals to whom the communication terminal 78 has forwarded the promotion message 64. Similarly, the communication terminal 88 when receiving the reminder 100 from the communication terminal 78 forwards reminders 106, 108 and 110 to communication terminals to whom the communication terminal 88 has forwarded the promotion message 64. The reminder may be forwarded to communication terminals who have accepted the promotion message or, alternatively, the reminder is forwarded to the communication terminals disregarding acceptance but only displaying on the communication terminals in case of acceptance thus enabling the users to decline a promotion message and to forward it. Hence the transmission tree/chain is formed but not broken by individual declining communication terminals.

In accepting a message the communication terminal may either accept or reject based on events in the calendar or list of programs, such as an EPG, in the communication terminal. For example, if an event is marked as BUSY, only reject messages and no acceptance message are transmitted. That is, if busy is marked at the defined time of the promotion message, the communication terminal automatically sends a busy message. Further, if the promotion server receives e.g. a certain number of reject messages, or the people requested to join are busy, the promotion server reschedules the event.

Thus, the users of the communication terminals 78 and 88, and any other communication terminals, who have transmitted an acceptance signal to the inviting communication terminal, receive a reminder so as to watch the media event either together or in parallel.

The communication system 60, contrary to the communication system 10 operating as a server client structure, utilises a tree structure for relaying reminders through the communication system 60. The databases 96 and 98 of the communication terminals 78 and 88, respectively, comprise information regarding who has transmitted a promotion message and to whom the communication terminals 78 and 88 have forwarded the promotion message to.

In a further embodiment of the present invention enables when the group is already enjoying the group event, that the current group members can send additional promotional messages based on the event. Thus new corners may be invited during the event as instant invitation.

The transmission of the reminder from the promotion servers 16 and 66 to a communication terminal may be triggered by the event manager 12, 62 on external trigger events such as an event start message received from a broadcaster system or may be triggered by the time data stored in the database 42, 92 for a particular media event associated with the promotion message 14, 64.

In an alternative embodiment of the present invention the communication terminals 28, 38, 78 or 88 further store an alert in respective local calendars included in the communication terminals 28, 38, 78 or 88 respectively. Before storing, the acceptance of time may be asked.

In a further alternative embodiment of the present invention the event managers 12 and 62 forward a promotion message encoded in a broadcast signal together with an ordinary broadcast to the media networks 20 and 70. The receivers in the media networks 20 and 70 decode the promotion message and transmit the promotion message to the communication terminals 28, 78 through local communication channels 21 and 71, such as Bluetooth, IF or serial cable.

Figure 3:
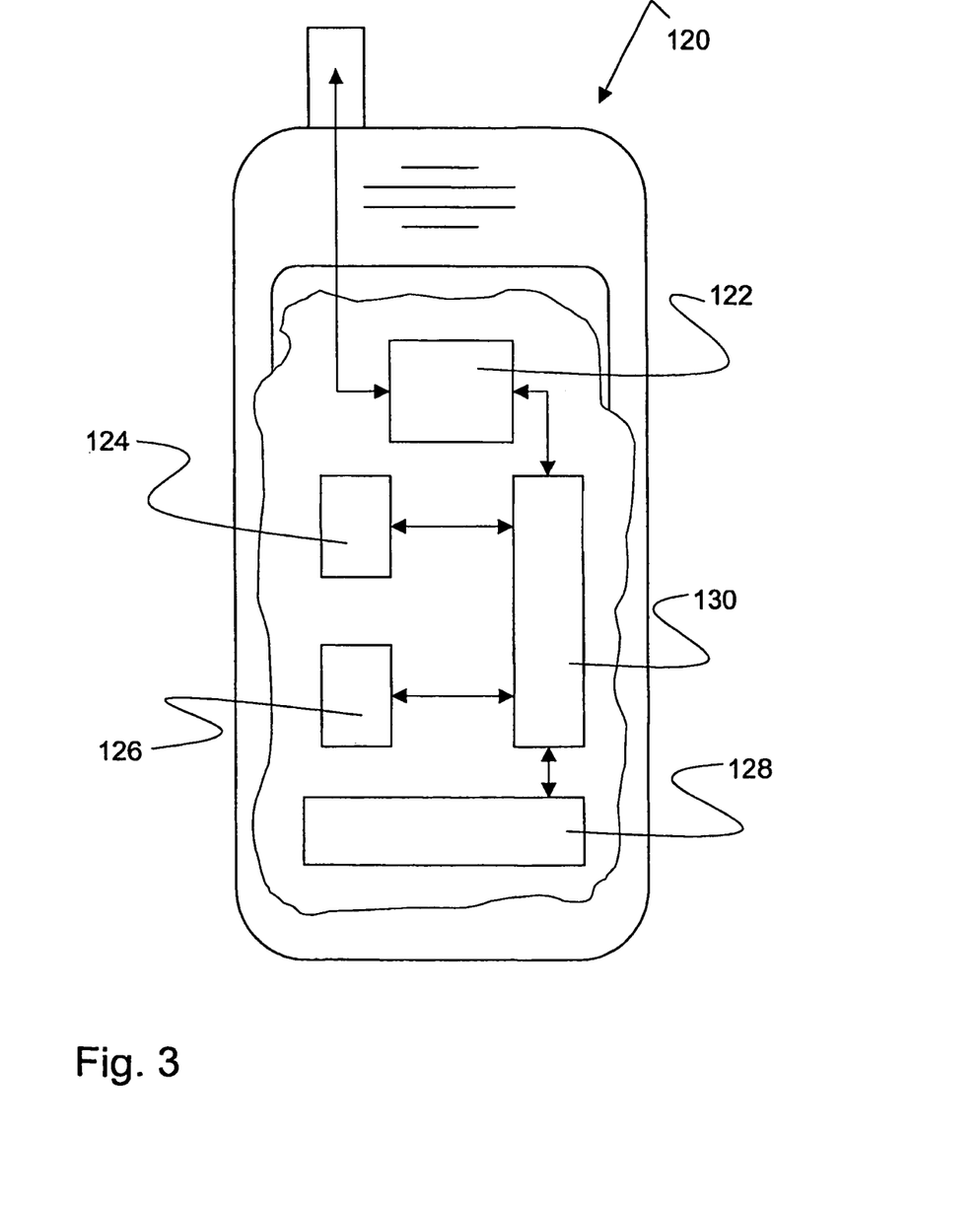
FIG. 3 shows a device according to a third embodiment of the present invention.

A communication terminal according to a third embodiment of the present invention is shown in FIG. 3 as designated in its entirety by reference numeral 120. The communication terminal 120 comprises a messaging module 122 for transmitting and receiving any types of messages through a wireless communication network; a calendar module 124 for enabling a user of the communication terminal 120 to perform general calendar operations, such as storing or retrieving any form for time related data e.g. alerts, meetings or special days; a media playback module 126 for outputting the promotion message either by display or loudspeaker or a combination thereof; a storage module 128 for storing information relating to group members of a promotion message, and a promotion messaging module 130 for receiving and transmitting a promotion message as described with reference to FIGS. 1 and 2.

The calendar module 124 may include or be separate from an electronic program guide (EPG) application. The EPG may be collected mainly from the service information (SI) like in the Digital Video Broadcasting (DVB) system. Then the EPG may be embedded with the information received from the promotion message or the user of the communication terminal may incorporate group events to the EPG. Further, in one embodiment of the present invention group event happenings may already be included in SI information so that users who have sent "YES" answers may join to enjoy to the program so that the number of participants is over the predefined threshold. Thus in this embodiment the promotion message is added to the SI information based on a sent acceptance message. When sending an answering message the identity of the program is taken from the SI information and the communication terminal identity from the communication terminal.

The promotion message may thus be created through the EPG and forwarded to an EPG application on a communication terminal via digital video broadcasting terrestrial (DVB-T) or radio data system (RDS). Further, the data created by the EPG may be transferred to a communication terminal through a general packet radio services (GPRS) when ever the user of the communication terminal so requests.

The communication terminal enables a user to send promotion messages by utilising program ID codes stored in the EPG. The user may send the programme ID code directly to other users of communication terminals, which upon acceptance and storage of said program ID code triggers acceptance of the program description and associated data.

An application user for a group communication during a specific program may be delivered over the air (OTA) with DVB-T, RDS or in fact in the EPG.

The promotion messaging module 130 utilises the messaging module for forwarding a promotion message to another communication terminal in a wireless communication network. The procedures applied in this transmission are described with reference to FIGS. 1 and 2 and will be further described with reference to FIG. 4.

If the communication terminal 120 operates in the communication system 60 according to the second embodiment of the present invention the storage module is utilised for storing a promotion message identity and information comprising transmitter identity and messaging contact information (or a pointer to the communication terminal's 120 storage module 128 holding this information), recipient identity and messaging contact information (or a pointer to the communication terminal's 120 storage module 128 holding this information), media event information such as identity code, name or title, start time and end time, and group application data, which data initialises and starts the reminder application on each communication terminal and even activates operationally the receiver of the communication terminal.

Furthermore, the communication terminal 120 utilises the calendar module 124 for storing local alerts pertaining the media event promoted by the promotion message.

Figure 4:
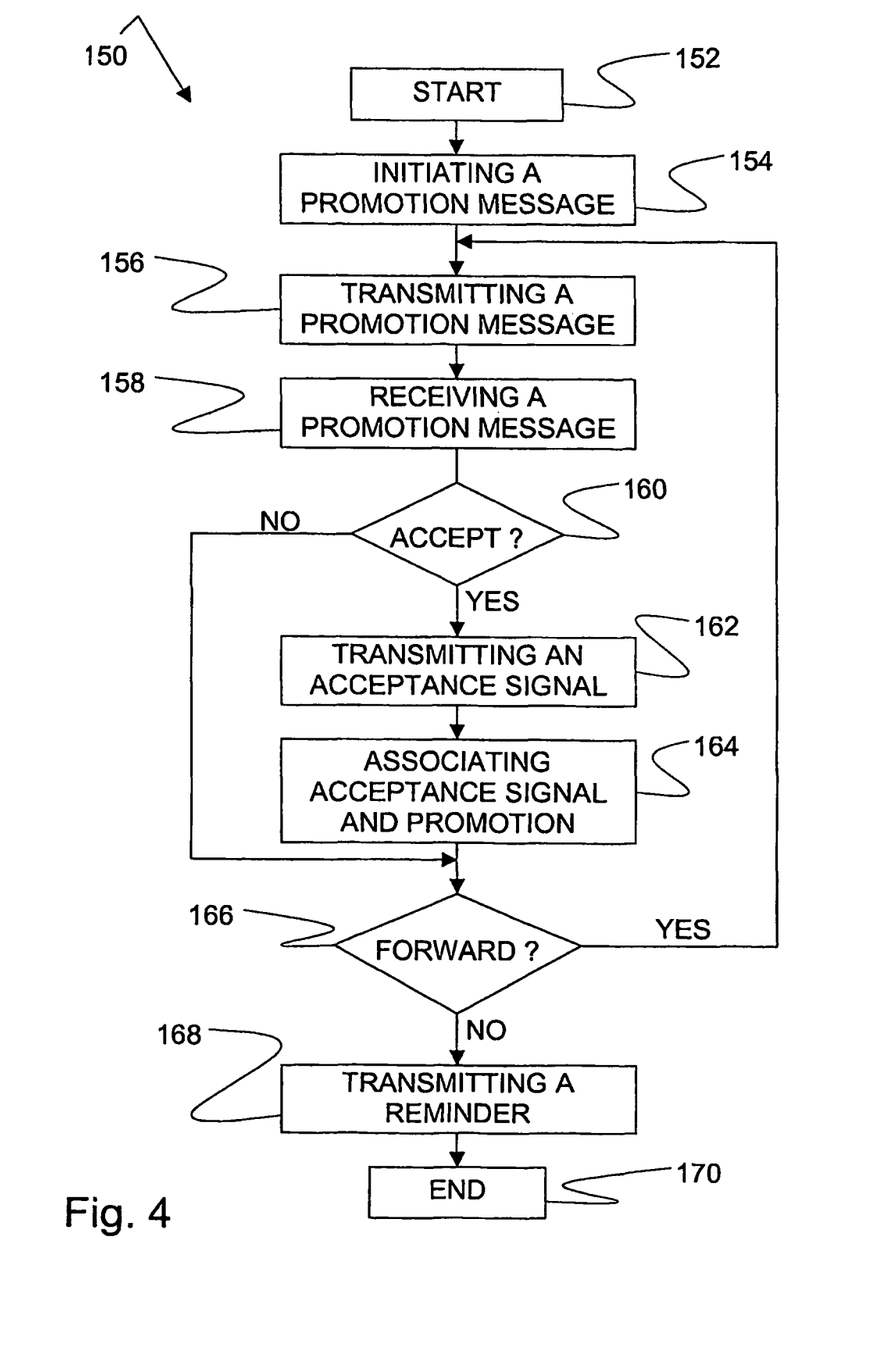
FIG. 4 shows a flow chart of method according to a second embodiment of the present invention.

FIG. 4 shows a method according to a third embodiment of the present invention designated in its entirety by reference numeral 150. The method 150 may be implemented in soft- and/or hardware in the event manager 12, 62, the promotion server 16, 66 and/or the communication terminals 28, 38, 78, 88 and/or 120.

The method 150 starts in step 152 and progresses following the establishment of the fundamental requirements of a communication system such as communication format and network members identities to the initiating of a promotion message 154. The initiation of a promotion message comprises the generation of a promotion message associated with a particular media event. The generation may be accomplished by an event manager per se or by a promotion message producer or a combination of thereof. The promotion message is during the initiating of the promotion message 154 forwarded from the event manager to the promotion server, where the promotion message is prepared for transmission to a predefined number of communication terminals connected in a wireless communication network, or to a randomly selected number of communication terminals connected in the wireless communication network, in this embodiment the promotion message may be incorporated as part of SI information in a DVB-T system, so that user may have this information as part of for example an EPG from which the user will get the information of possible selectable program alternatives to view. The communication terminals may be listed at the promotion server as subscribers for all or certain types of promotion messages or as non-subscribers to promotion messages from that particular promotion server.

Further, the initiating of a promotion message comprises registering particulars for the event relating to the promotion message. That is, particulars such as the time and date for the event, the duration of the event, the location of the event (e.g. channel), and the type of the event.

Transmitting a promotion message 156 is initiated by the promotion server by forwarding the promotion message to selected communication terminals or through broadcasting to the communication terminals in e.g. DVB-T communication. The promotion server utilises the above referenced lists for selecting the appropriate communication terminals and utilises the wireless communication network and network formats for ensuring that the selected communication terminals receive a readable copy of the promotion message.

Receiving a promotion message 158 is accomplished by the selected communication terminals and the communication terminals may run the promotion message on the communication terminal by utilising a display or a loudspeaker or a combination thereof.

The promotion message comprises an invitation to be reminded prior to the start of the event associated with the promotion message and the receiving communication terminals are presented with a question whether they accept 160 the invitation or not.

If the communication terminal accepts the invitation of the promotion message the method 150 initiates transmitting an acceptance signal 162. The acceptance signal causes the method 150 into associating acceptance signal and promotion message 164 for the accepting communication terminal to be registered in a database together with information regarding promotion message identity and information regarding transmitter identity and messaging contact information (or a pointer to the communication terminal's memory holding this information), recipient identity and messaging contact information (or a pointer to the communication terminal's memory holding this information), media event information such as identity code, name or title, start time and end time, and group application data, which data initialises and starts the reminder application on each communication terminal.

The method 150 further provides the communication terminals with the possibility to forward the promotion message, by answering "Yes" during forward 166, to further communication terminals in the wireless network. In case a particular communication terminal desires to forward the promotion message to another communication terminal in the wireless communication network the method returns to transmitting of a promotion message 156. If the communication terminal already has received the promotion message the communication terminal will reject the forwarded promotion message or, alternatively, the promotion server avoids to transmit to communication terminals, who already have received a copy of the promotion message.

If the receiving communication terminal answers "No" during accept 160 the method 150 is jumped to forward 166.

If the receiving communication terminals answer "No" during forward 166 the method 150 enters a final mode of transmitting a reminder 168. The reminder may be transmitted by the promotion server or by the communication terminal who has forwarded the promotion message to the receiving communication terminal. The first reminder structure utilises a client server method and the second reminder structure utilises a hierarchal method where a forwarding communication terminal is obliged to forward a reminder to the communication terminals accepting the promotion message forwarded by the forwarding communication terminal.

When the reminder has reached all the accepting communication terminals the method 150 enter its final step end 170, during which the promotion server returns to other promotion message and associated reminders to be transmitted to communication terminals in the wireless communication network.

Example

First Contact

User Abel receives a promotion message from the promotion server. The promotion message invites Abel to see TV show that starts the same evening at 8.15 on channel 1.

Abel watches the included slideshow and audio track and finds the TV show to be promising. He decides to accept the promotion message. A reminder is stored for 8.15.

Abel decides to invite some friends to enjoy the show together through the mobile terminals.

Abel Invites his Friend Bert

Abel attaches a short text note to the promotion message and sends it to his friend Bert.

Bert Receives the Invitation

Bert receives the invitation from Abel. He watches the included slideshow and audio track and finds the program to be interesting. He decides to accept the promotion message. A reminder is stored for 8.15.

Bert Invites Cecil and David

Bert attaches a short text note to the promotion message, replacing the note from Abel.

Bert sends the promotion message to his friends Cecil and David.

Cecil is not Interested

Cecil receives the promotion message, watches it and does not find the program interesting. He discards the promotion message.

David Receives the Promotion Message

David receives the promotion message from Bert. He watches the included slideshow and audio track and finds the program to be interesting. He decides to accept the promotion message. A reminder is stored for 8.15.

The Group

The group of users consists now of Abel, Bert and David. Any cyclical forwarding of the promotion message (such as David inviting Abel) can be disregarded by the receiving communication terminal and a suitable notification sent to the inviting party. Such cyclical relationships can be deduced from the unique promotion message identity assigned to each tree of promotion messages Despite the program the group is watching they may also have access to chat, instant message services, during the program so that they can interactively communicate to each other. Regardless of the nature of the broadcast program the group application may be e.g. chat or Netmeeting.

Maybe also different groups can join to the same group event. This may allow the group application to be a game, and the different groups compete against each other. Examples include quiz games, fighting games or sports games such as football.

The invention claimed is:

1. A system, comprising:
    at least one communication network;
    an event manager configured to provide an event to one or more receivers, the event manager generates a promotion message request inviting recipients to attend the event through a communication channel;
    a promotion server comprising a register; and
    one or more communication terminals interconnected with the promotion server and the event manager via the at least one communication network, wherein:
        the promotion server receives the promotion message request from the event manager;
        the promotion server generates a promotion message comprising an invitation to be reminded prior to a start of the event scheduled to start at a defined start time based on the promotion message request,
        the promotion server sends the promotion message to the one or more communication terminals through the at least one communication network,
        an accepting communication terminal of the one or more communication terminals generates an acceptance signal comprising a promotion message identity and an identity of the accepting communication terminal in response to the promotion message from the promotion server, the promotion server receives the acceptance signal sent from the accepting communication terminal accepting the promotion message from the promotion server, the promotion server associating the accepting communication terminal with the promotion message in response to reception of the acceptance signal from the accepting communication terminal, and the promotion server sends a reminder signal for the event to the accepting communication terminal based on the defined start time included in the promotion message through the at least one communication network.

2. The system according to claim 1, wherein the one or more communication terminals comprise at least one of mobile phones, cellular phones, personal office assistants or personal computers.

3. The system according to claim 1, wherein the promotion message comprises at least one of a text, a series of texts, a picture, a series of pictures, a video sequence, a series of video sequences, an audio track or a series of audio tracks.

4. The system according to claim 1, wherein the one or more receivers comprise at least one of a television, a radio, a set-top box, a receiver module for a computer, a multimedia terminal, a mobile or cellular phone, a personal office assistant or a personal computer.

5. The system according to claim 1, wherein the promotion message request comprises at least one of start time, end time of the event, duration of the event, event identity, event type, event presentation platform, the promotion message, and a list of the one or more receivers and the one or more communication terminals.

6. The system according to claim 5, wherein the one or more receivers comprises at least one of the following connected to a media communication network and a network broadcaster: a television, a radio, a set-top box, a receiver module for a computer, a multimedia terminal, a mobile or cellular phone, a personal office assistant or a personal computer.

7. The system according to claim 6, wherein the media communication network comprises at least one of a cable television network, a satellite television network, a radio frequency television network, a telephone network, a powerline network or a radio network.

8. The system according to claim 1, wherein the at least one communication network comprises at least one of a wired telecommunication network, a wireless telecommunication network, local area network, metropolitan area network, wide area network, or a dedicated communication line.

9. The system according to claim 1, wherein the promotion server further comprises a storage device configured to store the register, the reminder signal and the promotion message; and a processor configured to process communication with the one or more communication terminals, configured to process the promotion message request from the event manager, and to update information in the storage device.

10. The system according to claim 1, wherein the register comprises information of at least one of promotion message identity, one or more communication terminal identities, event data, time data, and group application data.

11. The system according to claim 1, wherein the one or more communication terminals further comprising a local register configured to associate the accepting communication terminal among the one or more other communication terminals with the promotion message on reception of the acceptance signal from the accepting communication terminal among the one or more other communication terminals; and the one or more communication terminals communicate the reminder signal to the accepting communication terminal among the one or more other communication terminals through the at least one communication network.

12. The system according to claim 1, wherein the one or more communication terminals are configured to start a predetermined application when receiving the reminder signal.

13. The system according to claim 1, wherein the promotion server is further configured to deduct from the register one or more cyclical promotion message transmission chains among the communication terminals.

14. The system according to claim 13, wherein one or more of the one or more cyclical promotion message transmission chains include one or more declining communication terminals that decline the promotion message yet forward the promotion message to the one or more other communication terminals.

15. The system according to claim 14, wherein the reminder signal is forwarded to the one or more declining communication terminals without being displayed thereat, and the one or more declining communication terminals relay the reminder signal to one or more accepting communication terminals based on the one or more cyclical promotion message transmission chains.

16. The system according to claim 1, wherein the event is scheduled to start at the defined start time by the event manager residing at a server, and the promotion message further comprises one or more instructions for notifying the accepting communication terminal of a launch of a shared application on the promotion server at the defined start time for access by the accepting communication terminal of a shared media experience.

17. The system according to claim 1, wherein the promotion message includes at least a part of an electronic program guide, or the promotion message is embedded in the electronic program guide.

18. The system according to claim 1, wherein the promotion server further being configured to receive rejection signals relating to the sent promotion message from rejecting communication terminals among the one or more communication terminals and among one or more other communication terminals invited through the one or more communication terminals, and wherein the promotion server further being configured to reschedule the event to start at a different defined start time upon receipt of a certain number of rejection signals.

19. A method, comprising:

receiving, at a promotion server, a promotion message request from an event manager, wherein the promotion message request comprises an invitation for recipients to attend an event through a communication channel;

generating, at the promotion server, a promotion message comprising an invitation to be reminded prior to a start of the event scheduled to start at a defined start time based on the promotion message request;

sending, with the promotion server, the promotion message to one or more communication terminals through a first communication network;

generating, with an accepting communication terminal of the one or more communication terminals, an acceptance signal comprising a promotion message identity and an identity of the accepting communication terminal in response to the promotion message from the promotion server;

receiving, at the promotion server, the acceptance signal sent from the accepting communication terminal accepting the promotion message from the promotion server;

associating, with the promotion server, the accepting communication terminal with the promotion message in response to receiving the acceptance signal from the accepting communication terminal via a register of the promotion server; and sending, with the promotion server, a reminder for the event to the accepting communication terminal based on the defined start time included in the promotion message through the first communication network, wherein the event manager is separate from the one or more communication terminals.

20. The method according to claim 19, further comprising:

receiving the acceptance signal from the accepting communication terminal among the one or more other communication terminals via the one or more communication terminals that invited the one or more other communication terminals; and associating the accepting communication terminal among the one or more other communication terminals with the promotion message on reception of the acceptance signal from the accepting communication terminal among the one or more other communication terminals via a local register of the one or more communication terminals that invited the one or more other communication terminals.

21. A non-transitory computer-readable storage medium carrying one or more sequences of one or more instructions which, when executed by one or more processors, cause an apparatus to at least perform the following steps:

receiving a promotion message request from an event manager configured to provide an event, corresponding to the promotion message request, to one or more receivers;

generating a promotion message comprising an invitation to be reminded prior to a start of the event scheduled to start at a defined start time based on the promotion message request;

causing sending of the promotion message including the event scheduled to start at the defined start time to one or more communication terminals through a first communication network;

receiving an acceptance signal comprising a promotion message identity and an identity of an accepting communication terminal relating to the sent promotion message from the accepting communication terminal of the one or more communication terminals;

associating the accepting communication terminal with the promotion message on reception of the acceptance signal from the accepting communication terminal via a register of the apparatus; and sending of a reminder for the event to said accepting communication terminal based on the defined start time included in the promotion message through the first communication network, wherein the event manager is separate from the one or more communication terminals.

22. An apparatus, comprising:

at least one processor; and at least one memory including computer program code, the at least one memory and the computer program code configured to, with the at least one processor, cause the apparatus to perform at least the following, receive a promotion message request from an event manager, wherein the promotion message request is associated with an event to one or more communication terminals;

generate a promotion message comprising an invitation to be reminded prior to a start of the event scheduled to start at a defined start time based on the promotion message request;

cause sending of said promotion message including said invitation to the one or more communication terminals through a first communication network;

receive an acceptance signal including a promotion message identity and an identity of an accepting communication terminal relating to the sent promotion message from the accepting communication terminal of the one or more communication terminals;

associate the accepting communication terminal with the promotion message on reception of the acceptance signal from the accepting communication terminal via a register of the promotion server; and cause sending a reminder for the event to said accepting communication terminal based on the defined start time included in the promotion message through the first communication network, wherein the event manager is separate from the one or more communication terminals.

* * * * *